United States Patent
Claussen et al.

(10) Patent No.: US 7,680,800 B2
(45) Date of Patent: Mar. 16, 2010

(54) ALGORITHM TO MARSHAL/UNMARSHAL XML SCHEMA ANNOTATIONS TO SDO DATAOBJECTS

(75) Inventors: Christopher Shane Claussen, Austin, TX (US); Zeenat Kulkarni, San Mateo, CA (US); Yang Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 11/134,733

(22) Filed: May 20, 2005

(65) Prior Publication Data

US 2007/0162466 A1 Jul. 12, 2007

(51) Int. Cl.
*G06F 17/30* (2006.01)
*G06F 17/00* (2006.01)
(52) U.S. Cl. ............ 707/10; 707/100; 715/249
(58) Field of Classification Search ............ 707/10, 707/100; 715/249
See application file for complete search history.

(56) References Cited

U.S. PATENT DOCUMENTS

| | | | | |
|---|---|---|---|---|
| 5,809,507 | A * | 9/1998 | Cavanaugh, III | 707/103 R |
| 6,044,409 | A * | 3/2000 | Lim et al. | 719/315 |
| 6,260,074 | B1 | 7/2001 | Radia et al. | 719/330 |
| 6,405,264 | B1 * | 6/2002 | Jindal et al. | 719/316 |
| 6,832,219 | B2 * | 12/2004 | Lal | 707/3 |
| 7,461,075 | B2 * | 12/2008 | Claussen et al. | 707/101 |
| 2002/0052984 | A1 * | 5/2002 | Jindal et al. | 709/330 |
| 2002/0120685 | A1 * | 8/2002 | Srivastava et al. | 709/203 |
| 2003/0018666 | A1 | 1/2003 | Chen et al. | 707/513 |
| 2004/0073870 | A1 | 4/2004 | Fuh et al. | 715/513 |
| 2004/0080549 | A1 | 4/2004 | Lord et al. | 345/854 |
| 2004/0172592 | A1 * | 9/2004 | Collie et al. | 715/503 |
| 2004/0220946 | A1 * | 11/2004 | Krishnaprasad et al. | 707/100 |
| 2004/0244012 | A1 * | 12/2004 | Massarenti | 719/319 |
| 2005/0216917 | A1 * | 9/2005 | Krishnaswamy et al. | 719/315 |
| 2005/0273703 | A1 * | 12/2005 | Doughan | 715/513 |
| 2006/0101423 | A1 * | 5/2006 | Aharoni et al. | 717/136 |
| 2006/0136555 | A1 * | 6/2006 | Patrick et al. | 709/203 |
| 2006/0173868 | A1 * | 8/2006 | Angele et al. | 707/100 |
| 2006/0265716 | A1 * | 11/2006 | Claussen et al. | 719/315 |
| 2007/0011126 | A1 * | 1/2007 | Conner et al. | 706/47 |
| 2008/0281866 | A1 * | 11/2008 | Claussen et al. | 707/103 Y |

OTHER PUBLICATIONS

Portier, Bertrand, et al., "Introduction to Service Data Objects", IBM Developerworks, Sep. 28, 2004, pp. 1-17 (downloaded from: www.ibm.com/developerworks/java/library/j-sdo/).*

(Continued)

*Primary Examiner*—Robert Stevens
(74) *Attorney, Agent, or Firm*—Yee & Associates, P.C.; Prentiss W. Johnson (57) ABSTRACT

When a data object is sent from one application to another, the marshaling code includes type information with transmission of the data object. When the data object is converted to the transmission format, type information for the data object is added to the transmission format element. The unmarshaling code uses the type information to obtain schema information for converting the transmission format element back to the data element.

8 Claims, 4 Drawing Sheets

OTHER PUBLICATIONS

Truyen, Eddy, et al., "Customization of Component-Based Object Request Brokers Through Dynamic Reconfiguration", Tools 33, Mont-Saint-Michel, France, Jun. 5-6, 2000, pp. 181-194.*

Widener, Patrick, et al., "Open Metadata Formats: Efficient XML-Based Communication for High Performance Computing", Cluster Computing, vol. 5, No. 3, Jul. 2002, pp. 315-324.*

Jørgensen, Bo Nørregaard, et al., "Customization of Object Request Brokers by Application Specific Policies", Middleware 2000, LNCS 1795, © 2000, pp. 144-163.*

Grechanik, Mark, et al., "Design of Large-Scale Polylingual Systems", ICSE '04, May 23-28, 2004, pp. 357-366.*

Jang, June, et al., "The Design and Implementation of the Surrogate System for J2ME Devices", TENCON 2004, vol. 3, Nov. 21-24, 2004, pp. 168-171.*

Brasileiro, Francisco, et al., "Eva: An Event Framework for Developing Specialised Communication Protocols", NCA 2001, Oct. 8-10, 2001, pp. 108-119.*

Grundmann, Tobias, et al., "TPO++: An Object-Oriented Message-Passing Library in C++", International Conf. on Parallel Processing, Toronto, Canada, Aug. 21-24, 2000, pp. 43-50.*

Beatty, John, et al., "Service Data Objects", A Joint Whitepaper with IBM and BEA, Nov. 2003, pp. 1-39 (downloaded from: download.boulder.ibm.com/ibmdl/pub/software/dw/library/j-commonj-sdowmt/Commonj-SDO-Specification-v1.0.pdf).*

Saracco, Cynthia M., et al., "Introduction to Service Data Objects", IBM Developerworks, Jul. 1, 2004, pp. 1-15 (downloaded from: www.ibm.com/developerworks/db2/library/techarticle/dm-0407saracco/index.html).*

Beatty, John, et al., "Next-Generation Data Programming", A Joint Whitepaper with IBM and BEA, Nov. 2003, pp. 1-15 (downloaded from: download.boulder.ibm.com/ibmdl/pub/software/dw/library/j-commonj-sdowmt/Next-Gen-Data-Programming-Whitepaper.doc).*

Microsoft Computer Dictionary, 5th Edition, Microsoft Press, Redmond WA, © 2002, pp. 33 and 225.*

Carey, Michael J., "XML in the Middle: XQuery in the WebLogic Platform", SIGMOD 2004, Paris, France, Jun. 13-18, 2004, pp. 901-902.*

Castro, Paul, et al., "A Programming Framework for Mobilizing Enterprise Applications", WMCSA 2004, Dec. 2-3, 2004, pp. 196-205.*

Borkar, Vinayak, "Liquid Data for WebLogic: Integrating Enterprise Data and Services", SIGMOD 2004, Paris, France, Jun. 13-18, 2004, pp. 917-918.*

* cited by examiner

```
<schema xmlns="http://www.w3.org/2001/XMLSchema" ...                    600
   <complexType name="Customer">
      <annotation>
         <appinfo>
   602 {   <PSFTBODefinitionASI xmlns="http://www.ibm.com/xmlns/prod/websphere/adapter/psft/
             PSFTBODefinitionASI/6.0.0">
               <hostname>zhangyanling</hostname>    604
               <ipaddress>9.181.25.250</ipaddress>   606
            </PSFTBODefinitionASI>
         </appinfo>
      </annotation>
      <attribute name="name" type="ID">
         <annotation>
            <documentation>
               <p: DO xmlns:p="someURI"  attr="value"/>
            </documentation>        608             610
         </annotation>
      </attribute>
   </complexType>
</schema>
```

ALGORITHM TO MARSHAL/UNMARSHAL XML SCHEMA ANNOTATIONS TO SDO DATAOBJECTS

BACKGROUND OF THE INVENTION

1. Field of the Invention

The present invention relates generally to transmission of data objects and, more particularly, to marshalling and unmarshalling extensible markup language schema annotations to a business object model framework.

2. Description of the Related Art

Developers use frameworks for application development. These frameworks typically include an architecture and an application programming interface (API). Java™ 2 Platform, Enterprise Edition (J2EE) is an example framework from Sun Microsystems for building distributed enterprise applications. J2EE™ services are performed in a middle tier between a user's machine and the enterprise's databases and legacy information systems.

When a data object in an application framework is transmitted from a sending device to a receiving device, the object is typically converted into a transmission format. The transmission format may be in a binary format or a text format. However, converting a data object from one format to another, and then reconverting the information back to the original format, can be a difficult task. The sending code must include instructions for converting the data object to the transmission format, and the receiving code must include instructions for rebuilding the object.

Currently, when a developer is writing code for sending and/or receiving a data object, the developer must re-invent the code for converting to and from the transmission format based on the specific type and structure of the data object. More specifically, the receiving code will expect certain object types and structures. If the receiving code receives a new object type, the receiving code will not know how to rebuild the data object.

SUMMARY OF THE INVENTION

The present invention recognizes the disadvantages of the prior art and provides type information with transmission of a data object. When a data object is converted to a transmission format, type information for the data object is added to the transmission format element. The unmarshalling code uses the type information to obtain schema information for converting the transmission format element back to the data element.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
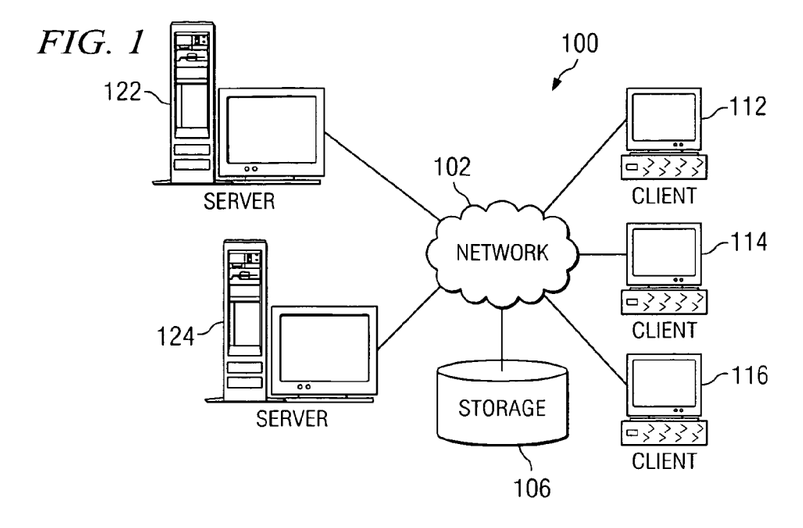
FIG. 1 depicts a pictorial representation of a network of data processing systems in which aspects of the present invention may be implemented.
Figure 2:
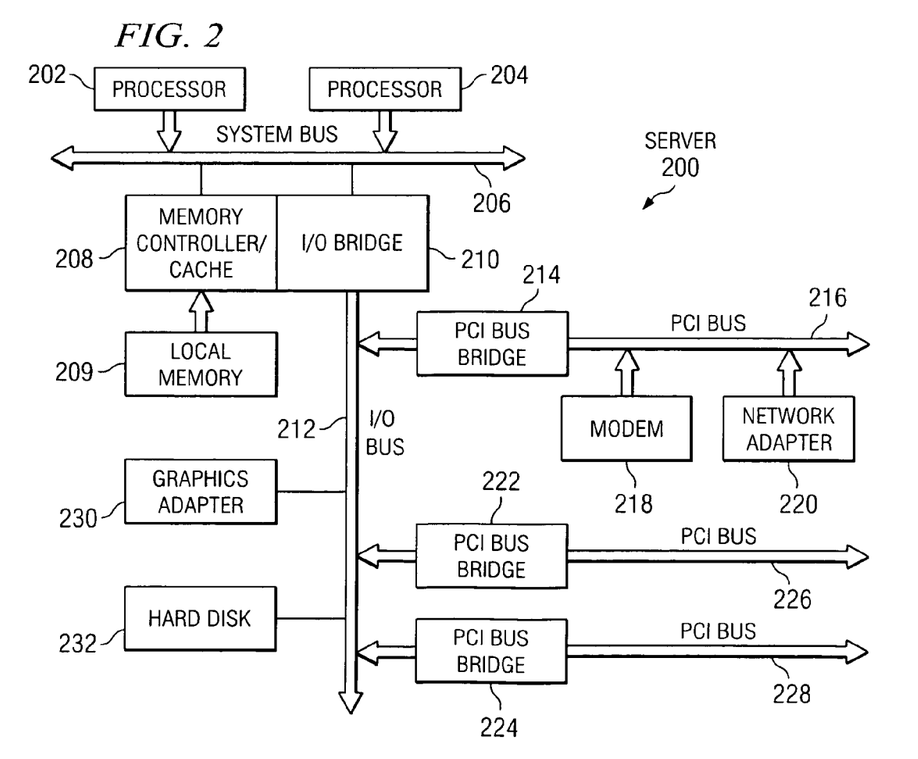
FIG. 2 is a block diagram of a data processing system that may be implemented as a server in accordance with an illustrative embodiment of the present invention.
Figure 3:
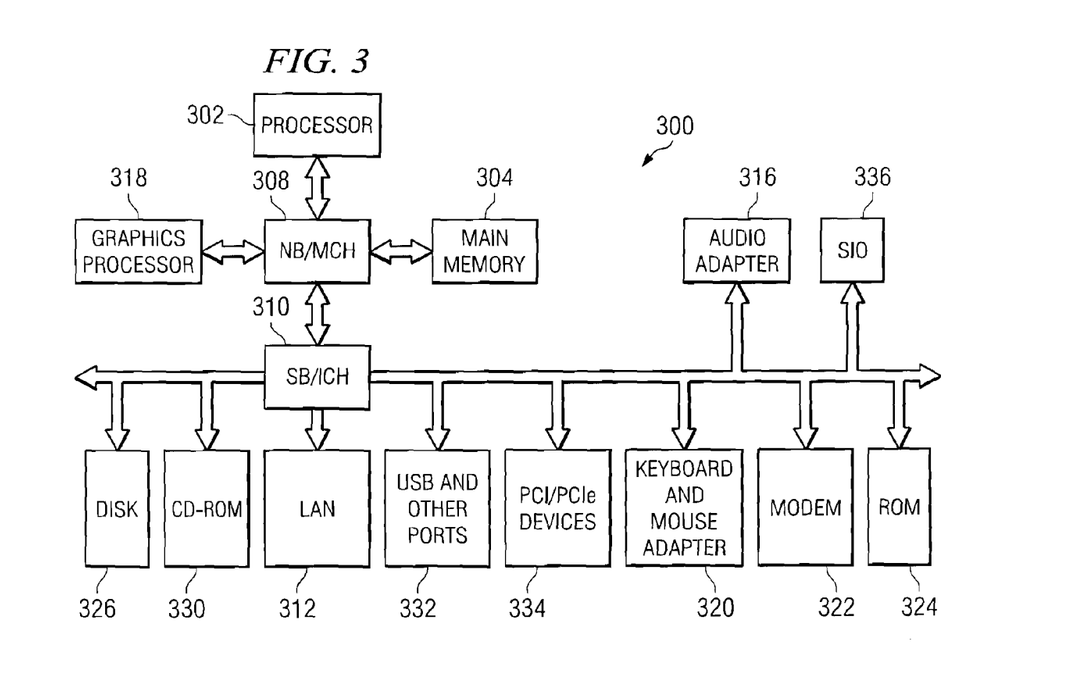
FIG. 3 is a block diagram of a data processing system in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 122, 124 connect to network 102 along with storage unit 106. In addition, clients 112, 114, 116 connect to network 102. These clients 112, 114, 116 may be, for example, personal computers or network computers. In the depicted example, server 122, for instance, may provide data, such as boot files, operating system images, and applications to clients 112, 114, 116. Clients 112, 114, 116 are clients to server 122 in the example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 that connect to system bus 206. Alternatively, a single processor system may be employed. Also connected to system bus 206 is memory controller/cache 208; which provides an interface to local memory 209. I/O bus bridge 210 connects to system bus 206 and provides an interface to I/O bus 212. Memory controller/cache 208 and I/O bus bridge 210 may be integrated as depicted.

Peripheral component interconnect (PCI) bus bridge 214 connects to I/O bus 212 provides an interface to PCI local bus 216. A number of modems may be connected to PCI local bus 216. Typical PCI bus implementations will support four PCI expansion slots or add-in connectors. Communications links to clients 112, 114, 116 in FIG. 1 or other servers may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® computer system, running the Advanced Interactive Executive (AIX®) operating system or LINUX operating system (eServer, pSeries, and AIX are trademarks of International Business Machines Corporation in the United States, other countries, or both, while Linux is a trademark of Linus Torvalds in the United States, other countries, or both).

With reference now to FIG. 3, a block diagram of a data processing system is shown in which aspects of the present invention may be implemented. Data processing system 300 is an example of a computer, such as client 108 in FIG. 1, in which code or instructions implementing the processes for embodiments of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM drive 330, universal serial bus (USB) ports and other communications ports 332, and PCI/PCIe devices 334 connect to ICH 310. PCI/PCIe devices may include, for example, Ethernet adapters, add-in cards, PC cards for notebook computers, etc. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

Instructions for the operating system, the object-oriented programming system, and applications or programs are located on storage devices, such as hard disk drive 326, and may be loaded into main memory 304 for execution by processor 302. The processes for embodiments of the present invention are performed by processor 302 using computer implemented instructions, which may be located in a memory such as, for example, main memory 304, memory 324, or in one or more peripheral devices 326 and 330. These processes may be executed by any processing unit, which may contain one or more processors.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the present invention may be applied to a multiprocessor data processing system.

As some illustrative examples, data processing system 300 may be a personal digital assistant (PDA), which is configured with flash memory to provide non-volatile memory for storing operating system files and/or user-generated data.

A bus system may be comprised of one or more buses, such as system bus 206, I/O bus 212 and PCI buses 216, 226 and 228 as shown in FIG. 2. Of course the buss system may be implemented using any type of communications fabric or architecture that provides for a transfer of data between different components or devices attached to the fabric or architecture. A communications unit may include one or more devices used to transmit and receive data, such as modem 218 or network adapter 220 of FIG. 2 or modem 322 or LAN 312 of FIG. 3. A memory may be, for example, local memory 209 or cache such as found in memory controller/cache 208 of FIG. 2 or main memory 304 of FIG. 3. A processing unit may include one or more processors or CPUs, such as processor 202 or processor 204 of FIG. 2 or processor 302 of FIG. 3. The depicted examples in FIGS. 1-3 and above-described examples are not meant to imply architectural limitations. For example, data processing system 300 also may be a tablet computer, laptop computer, or telephone device in addition to taking the form of a PDA.

Returning to FIG. 1, clients 112, 114, 116 and server 122, 124 may implement a Java™ programming environment, such as the J2EE™ platform. More specifically, in an exemplary embodiment, clients 112, 114, 116 and server 122, 124 may implement a service data object (SDO) framework, which includes an architecture and an application programming interface (API). SDO simplifies the J2EE™ data programming model and incorporates J2EE™ patterns and best practices. SDO also abstracts data in a service-oriented architecture, unifies data application development, and supports and integrates extensible markup language (XML).

XML is becoming ubiquitous in distributed applications. XML schema may be used to define business rules in an application's data format. XML itself may be used to facilitate interaction. For this reason, XML is often used as the transmission format for transmitting data objects from one application to another.

SDO clients use the SDO framework to work with data. Instead of using technology-specific APIs and frameworks, the SDO clients use the SDO programming model and API. SDO clients work on SDO data graphs and do not need to know how the data they are working with is persisted or serialized.

Data objects are the fundamental component of SDO, as represented in the name of the Service Data Objects framework specification itself. Data objects are the representation of structured data. SDO data objects are generic and provide a common view of structured data built by a data management system. While a Java Database Connectivity (JDBC™) data management system, for instance, needs to know about the persistence technology and how to configure and access it, a SDO client need not know anything about the specific technology. SDO data objects hold their "data" in properties and provide convenient creation and deletion methods and reflective methods to get their types. SDO data objects are linked together and contained in data graphs. Data graphs provide a container for a tree of SDO data objects.

In accordance with exemplary aspects of the present invention, the sending code marshals, or serializes, the data object as XML into XML schema annotation. XML schema allows annotation. The sending code adds type information for the data object into the XML annotation. The receiving code then identifies the type information in the XML annotation and uses this type information to build the data object on the receiving end.

Figure 4:
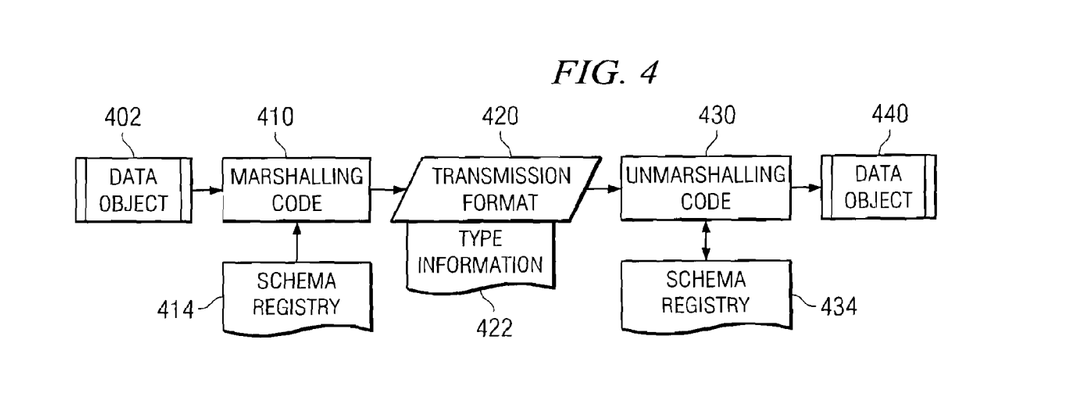
FIG. 4 is a diagram illustrating marshalling and unmarshalling of a data object in accordance with exemplary aspects of the present invention.

With reference to FIG. 4, a diagram illustrating marshalling and unmarshalling of a data object is shown in accordance with exemplary aspects of the present invention. Data object 402 is serialized by marshalling code 410 into transmission format 420. Data object 402 may be, for example, a SDO data object, a J2EE™ data object, or a data object in any other application programming framework. Marshalling code 410 may be, for example, a SDO API; however, marshalling code 410 may be any code that transmits data object 402 over a network, software, or other communication channel. Also, transmission format 420 may be XML, although other transmission formats may be used depending upon the implementation, such as other text formats or binary format.

When marshalling code 410 serializes data object 402, schema registry 414 may be consulted to determine the schema for serializing the data object. Marshalling code 410 identifies type information for data object 402 from schema registry 414 and adds the type information 422 to transmission format 420. Type information 422 may include, for example, the type name, name space, property name(s), and property type(s).

Unmarshalling code 430 at the receiving end receives transmission format 420 with type information 422. Unmarshalling code 430 must know how to rebuild the data object. This information may be found in schema repository 434. However, the object type must be known to obtain the necessary information from schema repository 434. Unmarshalling code 430 may then use the type information 422 to deserialize transmission format 420 to form data object 440. Thus, unmarshalling code 430 at the receiving end need not know ahead of time the specific schema used to serialize the data object.

Figure 5:
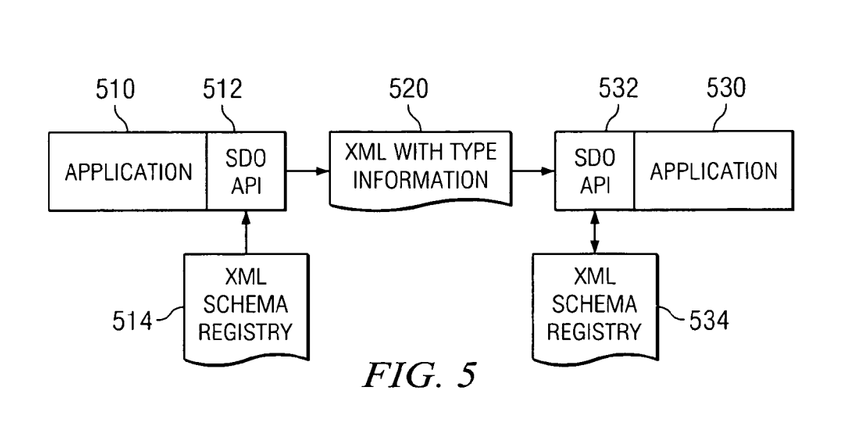
FIG. 5 is a diagram illustrating marshalling and unmarshalling XML schema annotations to SDO data objects in accordance with exemplary aspects of the present invention.

FIG. 5 is a diagram illustrating marshalling and unmarshalling XML schema annotations to SDO data objects in accordance with exemplary aspects of the present invention. Applications 510 and 530 operate within the SDO application development framework. A SDO client may access a data object through SDO API 512. For example, application 530 may request a SDO data object from application 510. SDO API 512 then marshals the data object into XML with XML schema annotation 520. SDO API 522 unmarshals XML 520 into the SDO data object for use by application 530.

When application 510 sends a SDO data object to application 530, SDO API 512 adds type information to the XML as XML schema annotation. SDO API 532 identifies and extracts the object type information from the XML annotations in 520 and uses the type information to obtain the appropriate XML schema information from XML schema registry 534 to unmarshal the data object for application 530.

Figure 6:
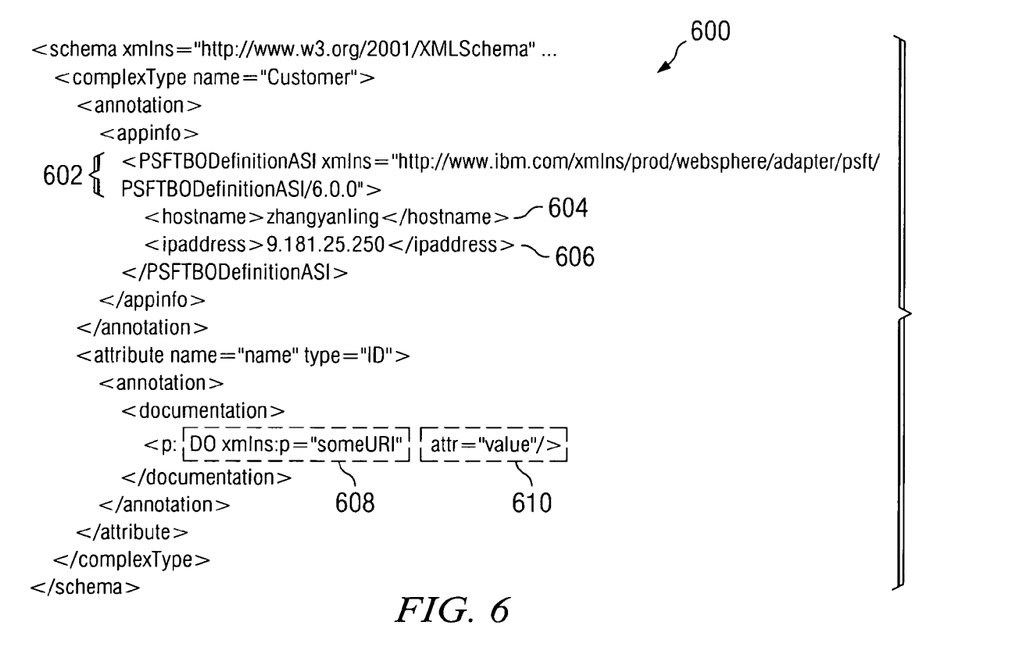
FIG. 6 illustrates an example XML schema with annotation in accordance with exemplary aspects of the present invention.

FIG. 6 illustrates an example XML schema with annotation in accordance with exemplary aspects of the present invention. The unmarshalling code, such as SDO API 532 in FIG. 5, looks for type "PSFTBODefinitionASI" under the name space (xmlns) 602 and use the type to unmarshal the properties "hostname" 604 and "ipaddress" 606. Similarly, the type "DO" under name space 608 is used to unmarshal the property "attr" 610. This type information may then be used to identify the XML schema necessary for unmarshalling the data object.

Figure 7:
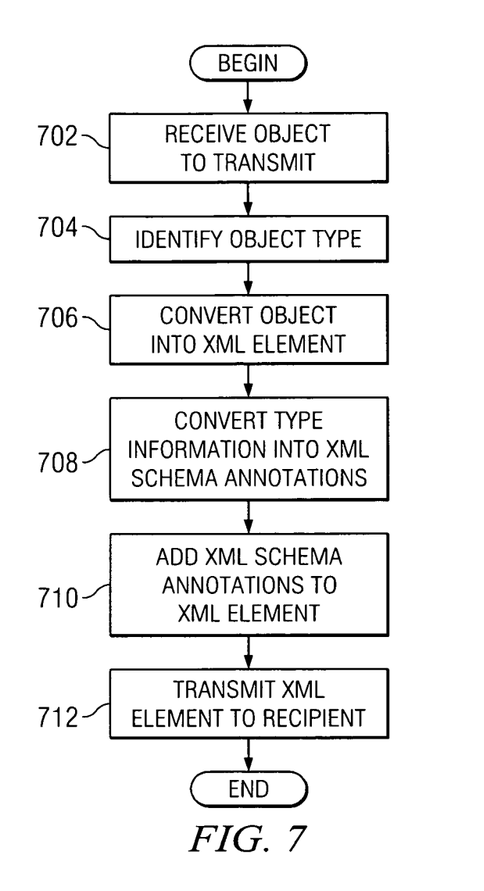
FIG. 7 is a flowchart illustrating marshalling a data object into XML in accordance with exemplary aspects of the present invention.

FIG. 7 is a flowchart illustrating marshalling a data object into XML in accordance with exemplary aspects of the present invention. Operation begins and the marshalling code receives an object to be transmitted (block 702). The marshalling code then identifies the object type (block 704) and converts the object into an XML element for transmission (block 706).

Next, the marshalling code converts the type information into XML schema annotations (block 708) and adds the XML schema annotations to the XML element (block 710). Thereafter, the marshalling code transmits the XML element to the recipient (block 712) and operation ends.

Figure 8:
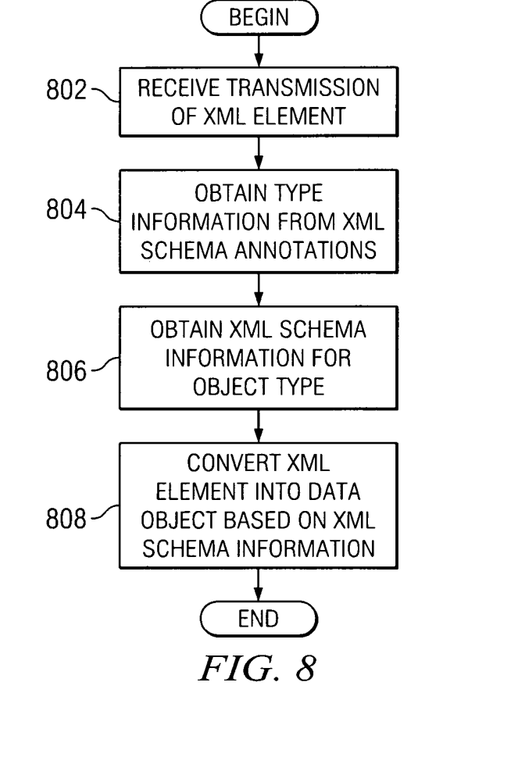
FIG. 8 is a flowchart illustrating operation of unmarshalling a data object from XML in accordance with exemplary aspects of the present invention.

FIG. 8 is a flowchart illustrating operation of unmarshalling a data object from XML in accordance with exemplary aspects of the present invention. Operation begins and the unmarshalling code receives transmission of an XML element (block 802). The unmarshalling code obtains type information from XML schema annotations in the XML element (block 804). Then, the unmarshalling code obtains XML schema information for the object type (block 806) and converts the XML element into a data object based on the XML schema information (block 808). Thereafter, operation ends.

Thus, the present invention solves the disadvantages of the prior art by providing type information with transmission of a data object. When a data object is converted to a transmission format, type information for the data object is added to the transmission format element. The unmarshalling code uses the type information to obtain schema information for converting the transmission format element back to the data element.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, for transmitting a data object from a sender to a recipient, the method comprising:
    identifying a type information for the data object, wherein the data object is a type of service data object;
    marshaling the data object into a transmission format element using an application program executing on a processor of the data processing system, wherein marshaling comprises retrieving a schema information from a sender extensible markup language schema registry and serializing the data object into extensible markup language according to the schema information, and wherein the data object comprises a representation of a data structure created by an application programming framework;
    annotating the transmission format element with the type information to create an annotated transmission format element;
    sending the annotated transmission format element from the sender to the recipient;
    receiving the annotated transmission format element at the recipient;
    extracting the type information from the annotated transmission format element at the recipient;
    using the type information extracted from the annotated transmission format element to retrieve the schema information from a recipient extensible markup language schema registry at the recipient; and
    unmarshaling the annotated transmission format element into the data object at the recipient based on the schema information retrieved from the recipient extensible markup language schema registry.

2. The method of claim 1, wherein the data object complies with a services data object framework.

3. The method of claim 1, wherein the receiving, extracting, retrieving, and unmarshaling steps are performed by an application programming interface at the recipient.

4. A system comprising:
    a network;
    a sending device connected to the network, wherein the sending device identifies a type information for the data object, marshals the data object into a transmission format element using an application program executing on a processor of a data processing system by retrieving a schema information from a sender extensible markup language schema registry connected to the sending device, serializes the data object into extensible markup language according to the schema information, annotates the transmission format element with the type information to create an annotated transmission format element, and sends the annotated transmission format element from the sending device to a recipient device, wherein the data object is a type of service data object comprising a representation of a data structure created by an application programming framework; and
    the recipient device connected to the network, wherein the recipient device receives the annotated transmission format element at the recipient, extracts the type information from the annotated transmission format element at the recipient device, uses the type information extracted from the annotated transmission format element to retrieve the schema information from a recipient extensible markup language schema registry, and unmarshals the annotated transmission format element into the data object at the recipient device based on the schema information retrieved from the recipient extensible markup language schema registry.

5. The system of claim 4, wherein a format of the transmission format element is extensible markup language.

6. A computer program product comprising:
    a computer usable storage-type medium having computer usable program code for transmitting a data object, the computer usable program code configured to cause a processor of a computer to perform the following:
    identifying a type information for the data object, wherein the data object is a type of service data object;
    marshaling the data object into a transmission format element using an application program executing on a processor of the data processing system, wherein marshaling comprises retrieving a schema information from a sender extensible markup language schema registry and serializing the data object into extensible markup language according to the schema information, and wherein the data object comprises a representation of a data structure created by an application programming framework;
    annotating the transmission format element with the type information to create an annotated transmission format element;

sending the annotated transmission format element from a sender to a recipient;

receiving the annotated transmission format element at the recipient;

extracting the type information from the annotated transmission format element at the recipient;

using the type information extracted from the annotated transmission format element to retrieve the schema information from a recipient extensible markup language schema registry at the recipient; and unmarshaling the annotated transmission format element into the data object at the recipient based on the schema information retrieved from the recipient extensible markup language schema registry.

7. The computer usable medium program product of claim 6, wherein the data object complies with a services data object framework.

8. The computer usable medium program product of claim 6, wherein the computer usable program code is included in an application programming interface at the recipient.

* * * * *